May 25, 1937.  J. MUROS  2,081,366
SHAVING IMPLEMENT
Filed Dec. 17, 1936
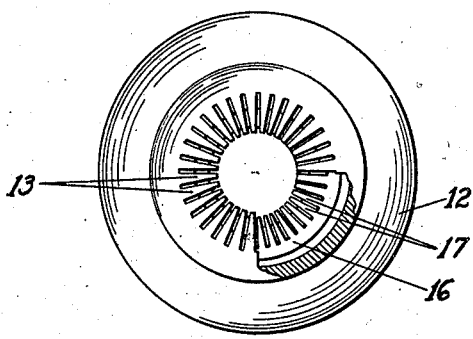
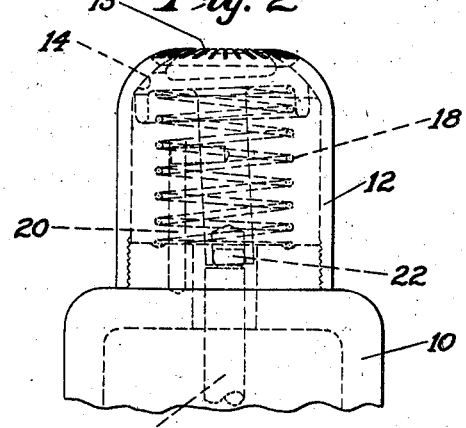
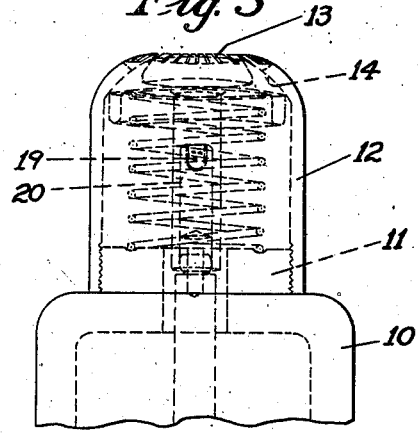
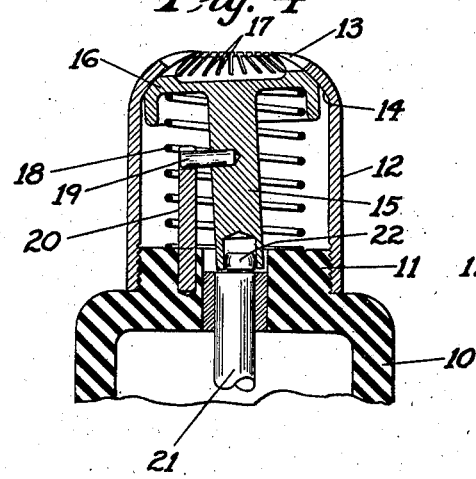
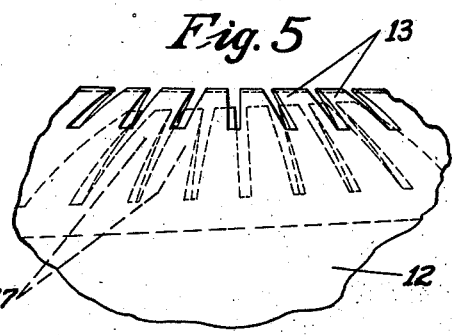
INVENTOR
Joseph Muros.
BY
ATTORNEY Patented May 25, 1937

2,081,366

UNITED STATES PATENT OFFICE 2,081,366

SHAVING IMPLEMENT

Joseph Muros, Cambridge, Mass., assignor to Gillette Safety Razor Company, Boston, Mass., a corporation of Delaware Application December 17, 1936, Serial No. 116,368

12 Claims. (Cl. 30—43)

This invention relates to implements of the general type employing co-operating shearing members relatively movable with a combined rocking and tilting or wobbling motion for shaving without the use of lather. The present invention consists in an implement of this type having a series of transverse or radially disposed shearing teeth which are arranged to be brought into shearing engagement in a progressive manner.

In one aspect the invention consists in an implement including in its structure a guard member having an annular portion with a series of divergent slots forming shearing teeth therein, in combination with a rocking cutter having similarly arranged slots and teeth and being enclosed within the guard member and guided for definite movement therein such as to cause a progressive shearing engagement between the teeth of the respective series.

It is important in implements of the type under discussion to maintain the shearing teeth in open relation during as long an interval in the operating cycle as possible, in order that the hairs to be cut may have an opportunity of freely entering and reaching shearing position as the implement is moved over the face of the user. It will be apparent that so long as some teeth of the cutter, for example, remain in registration with some spaces of the guard no hair can enter those spaces even if the implement is otherwise properly presented to the areas to be shaved. In accordance with the present invention, therefore, it is proposed to limit the movement of the cutter with reference to the guard so as to insure a condition of maximum open spaces at definite points in the operating cycle and to limit the relative movement of the co-operating parts so that the spaces between the teeth shall be closed only so long as is necessary to bring the teeth into complete shearing engagement and immediately retract them.

One desirable form of implement which embodies my invention includes in its structure an outer or guard member presenting a slotted annular ring and a curved guiding surface, in combination with a cutter having a circular slotted portion, and spherical guiding surfaces and driving connection whereby a wobbling movement is imparted thereto. The cutter is prevented from spinning on its own axis and maintained in the desired relation of registration with the guard member by a pin and slot connection of appropriate design and effect. As herein shown, a pin is provided which is located substantially at the center of movement of the cutter and this is controlled in its movement by a slot provided for that purpose in a bar or other element of the combination.

These and other features of the invention will be best understood and appreciated from the following description of a preferred embodiment thereof, selected for purposes of illustration and shown in the accompanying drawing, in which:—

Fig. 1 is an end view on an enlarged scale of the implement, a portion of the guard member being shown as broken away;

Fig. 2 is a view in side elevation, a portion of the casing being shown as broken away;

Fig. 3 is a similar view in elevation at right angles to that of Fig. 2;

Fig. 4 is a view similar to Fig. 2 but in longitudinal section; and

Fig. 5 is a fragmentary view on a still larger scale of portions of the shearing members.

The implement includes in its structure a casing 10 of a condensation product or other molded material which is shaped to serve as a handle for the implement and as a housing for the motor actuating it. A portion only of the casing 10 is shown in Figs. 2, 3 and 4. The upper end of the casing is formed with an externally threaded upstanding boss 11 and threaded thereon is a cylindrical metallic shell or casing 12 rounded inwardly and partially closed at its upper end. The inturned end of the shell 12 constitutes in effect an annular flange and in this is formed a series of radial slots defining shearing teeth 13, the slots being arranged with a uniform circumferential spacing and extending radially and divergently out into the curved portion of the end of the shell 12, as will be observed in Fig. 4 particularly. The radius of the external end surface of the shell 12 is shorter than the radius of the internal wall 14. The wall 14 presents a spherical guiding surface having a center of curvature coinciding with the center of curvature of part of the cutter member as will presently be described.

The cutter itself comprises a cylindrical shank 15 and a circular head 16 having an outer spherical surface of the same radius of curvature as the inner guiding surface 14 of the shell 12. The upper portion of the head 16 is slotted to provide a series of radially and downwardly extending shearing teeth 17. The shearing teeth of the cutter are divergent and longer but somewhat narrower than the teeth 13 of the guard or shell 12 and arranged with the same spacing.

In their preferred working relation, as best shown in Fig. 5, the cutter is so arranged with respect to the shell 12 that certain of its teeth 17 on opposite sides register with the corresponding teeth 13 of the shell. The cutter is maintained in this position at one point of the operating cycle, and is prevented from spinning on its own axis by the engagement of a transverse pin 19 in the shank 15 of the cutter with a forked bar 20 which projects upwardly from the end boss 11 of the casing and loosely engages the pin 19. The pin 19 is inserted in the stem 15 so that it passes through its center of movement and, therefore, partakes of minimum motion in the operation of the cutter. The inner end of the pin also marks the center of curvature of the co-operating spherical surfaces formed respectively in the inner walls of the shell 12 and the outer face of the cutter head 16.

The purpose of the pin 19 and forked bar 20 is two-fold. First, it maintains the two shearing members always in the proper position to hold certain of the shearing slots opened so that hairs may pass freely thereinto in the shaving operation, and in the second place, it prevents the cutter from freely spinning about its own axis under the actuation of the eccentric head 22 and thus confines it to a wobbling motion in which a shearing movement is imparted progressively to the teeth about the circumference of the circular end face of the shell 12.

The cutter head 16 is provided with a downwardly extending annular flange forming a pocket in which is received the upper end of a compression spring 18. The spring bears at its lower end against the upper face of the boss 11 and thus serves to maintain the surface of the cutter head 16 in firm but yielding engagement with the spherical guiding surface 14 of the shell 12.

A rotary movement is imparted to the lower end of the cutter shank 15 by a motor-driven shaft 21 arranged concentrically within the casing 10 and shell 12 and having in its upper end an eccentric head 22 which is received in a recess provided for that purpose in the end of the stem 15.

In use the shaft 21 is continuously rotated at high speed by a motor, not shown, contained within the main casing 10. The rounded end of the implement is presented to the face or other surface to be shaved and moved over the same in any desired direction with the purpose of causing the hairs to enter the slots in the end face of the shell 12 between the teeth 13. A wobbling motion is thus imparted to the cutter head 16 which causes the shearing teeth 17 to make shearing engagement with the teeth 13 in a progressive manner about the circumference of the overlapping spherical portions of the cutter 16 and head 12.

In Fig. 4 the eccentric head 22 is shown as occupying its extreme right-end position and the cutter head is, therefore, tipped down on its left-hand side. The pin 19 is likewise tipped downwardly to the extremity of its throw between the forks of the bar 20. As the eccentric moves in a circular path the cutter head 16 is tilted and rocked, first, toward and then away from the observer into a position of opposite inclination from that shown in Fig. 4, or in other words, a resultant wobbling motion is imparted to the cutter which causes the progressive shearing action of the radially disposed teeth in the manner already explained.

Having thus disclosed my invention and described an embodiment thereof by way of illustration and not limitation, I claim and desire to secure by Letters Patent:—

1. An implement of the class described having co-operating members both presenting radially disposed shearing edges and spherical guiding surfaces, and means for imparting a wobbling movement to one of said members to move its shearing edges progressively with respect to the shearing edges of the other member.

2. An implement of the class described including in its structure co-operating members having superposed spherical walls with a series of divergent shearing teeth in each of said walls, and means for imparting a relative wobbling movement to said members to cause a progressive shearing action between said teeth.

3. An implement of the class described including in its structure a guard member having a spherical annular portion with a series of divergent slots forming shearing teeth therein, a cutter having similarly arranged slots and teeth therein and being enclosed within said guard member, and power means for imparting a wobbling movement to the cutter.

4. An implement of the class described including in its structure a guard member having a spherical end face with a circular opening therein and a series of tooth-forming slots extending in divergent relation outwardly from the edge of said opening, and a rocking cutter mounted therein and having teeth movable transversely across the teeth of the guard.

5. An implement of the class described including in its structure a guard member with an annular spherical portion having slots forming a series of shearing teeth, a cutter mounted for rocking and tilting movement therein and having slots similarly arranged but of substantially greater length than the slots of the guard.

6. An implement of the class described including in its structure co-operating members having annular faces with radially disposed shearing edges therein, means limiting relative rotary movement of said members to maintain a predetermined relation of their shearing teeth, and means for imparting a relative wobbling movement to said members.

7. An implement of the class described including in its structure co-operating members having annular faces with radially disposed shearing edges therein, means for imparting a relative wobbling movement to said members, and means for limiting the rotary component of such movement to insure a high ratio of open time to closed time in the shearing cycle of the implement.

8. An implement of the class described including in its structure guard and cutter members having radially disposed co-operating shearing teeth and being arranged for relative wobbling movement, and means acting on the cutter substantially at its axis of movement for limiting the turning movement thereof.

9. An implement of the class described including in its structure guard and cutter members having radially disposed co-operating shearing teeth and being arranged for relative wobbling movement and means for restricting the rotary movement of the cutter while leaving it free to rock.

10. An implement of the class described including in its structure guard and cutter members having radially disposed co-operating shearing teeth and being arranged for relative wobbling movement, a pin projecting transversely from the cutter, and a forked bar engaging the free end of said pin.

11. An implement of the class described including in its structure a guard having an inturned slotted rim, a cutter mounted therein and having a slotted head, a coiled spring engaging the cutter head, and mechanism located within the spring to restrict rotary movement of the cutter.

12. An implement of the class described comprising a cylindrical casing having an inturned rim presenting shearing teeth and a spherical guiding surface, a cutter mounted within the casing and having a stem and a flanged head presenting corresponding shearing teeth and guiding surface, a spring engaging the cutter head within its flange, means within the spring for limiting the cutter movement, and driving means acting upon said stem for imparting a rocking and tilting movement to the cutter.

JOSEPH MUROS.